Jan. 9, 1951   B. EISNER ET AL   2,537,659
JOINT FOR PIPE AND CONDUITS
Filed Aug. 24, 1945

Inventors
Benjamin Eisner
John Otis Ererhart
Earle T. Montgomery
By H. S. McDowell, Attorney Patented Jan. 9, 1951

2,537,659

UNITED STATES PATENT OFFICE 2,537,659

JOINT FOR PIPE AND CONDUITS

Benjamin Eisner, Brooklyn, N. Y., and John Otis Everhart and Earle T. Montgomery, Columbus, Ohio, assignors, by mesne assignments, to The National Clay Pipe Research Corporation, Logan, Ohio, a corporation of Ohio Application August 24, 1945, Serial No. 612,396

2 Claims. (Cl. 285—163)

The present invention provides a joint of improved design for uniting the interfitting ends of pipe of the bell and spigot and, also, other types. Producers of clay sewer pipe have been placed competitively in a disadvantageous position by reason of the lack of a satisfactory method of joining or coupling pieces of sewer pipe in a line. The tests of a good sewer pipe joint are that they will prevent infiltration or exfiltration of water, resist the penetration of tree roots, be simple and inexpensive to install, permit ready inspection and testing and have a service life expectancy comparable to that of the sewer pipe itself. Conventional types of sewer pipe joints are either made in place or fabricated partially in advance. Made in place joints comprise principally those in which the joining material is a Portland cement mortar or a poured asphaltic compound. In either case, jute or other material is used as a pre-seal to prevent loss of the joining material during or after the making of the joint. Partially prefabricated joints are essentially those made of asphaltic compounds, wherein collars are precast upon the spigot and the inside socket of the pipe in such a manner that one end fits into the other. With this type of joint, manufacturers usually recommend the employment of either an adhesive or solvent to retain the two collars together after the pipe members have been joined.

The disadvantage of any joint made in place is that there can never be assurance before adequate test that all the annular space, formed between the complemental ends of a pair of interfitting and adjoining pipe members, has been completely filled. If made of cement mortar, large voids may occur which are impossible to discover readily. In the case of poured asphaltic material, the latter may chill or fail to close completely. In either case, there is always the risk of subsequent shrinkage and lack of adequate bond with the clay pipe surface.

Another important reason that satisfactory joints have not been formed in the past is the failure on the part of the clay pipe industry to be able to control within close limits the final dimensions of its products. Dimensional tolerances are necessarily broad. Hence any type of mechanical joint is impracticable unless some additional dimensional control is added. Therefore, it is an object of the present invention to provide a pipe joint so formed as to accomplish at once a means of providing adequate dimensional control for obtaining a reasonable degree of water tightness, means for making it impossible to introduce voids or points of leakage by reason of the failure of workmen to carry out their duties properly or adequately, and means for securing equal efficiency in these respects when pipe members are coupled in straight longitudinal alignment or with angular deflections at the joints.

It is an object of the present invention to provide an improved leak-proof construction for the adjoining ends of pipe members which may be quickly and securely united at the time the pipe is laid by the mere insertion of the spigot end of one pipe member into the bell socket of the next adjacent pipe member.

It is another object to provide a pipe joint for pipes of the character indicated in which the inner walls of the bell ends thereof are formed with a molded band constituting a socket collar, and wherein the outer surfaces of the spigot ends of said pipe members are formed with a complemental spigot collar, the said collars, when the pipe members are in assembled relation, being relatively spaced to receive between them a packing ring of compressible or pressure-deformable material, whereby to admit of certain axial deviation of the pipe members without affecting the fluid-sealing properties of the joints.

In carrying out the present invention, water tightness at joints where two complemental pipe members have a deflection angle between their center lines is attained by reason of the special and peculiar shape of the socket collar and the compressible ring or gasket. The inner cross sectional configuration of the socket is of frustoconical form and the compressible ring or gasket when operatively positioned lies in a given plane. Irrespective of the angle of deflection at the joint, the inner section of the plane of the ring and the conical inner surface of the collar in the pipe socket constitute an ellipse. With ordinary angles of deflection, this ellipse is but slightly eccentric, and hence the degree of compression obtained in the ring or gasket is sensibly the same at all points. The tightness of the joint, therefore, is dependent upon the degree of compression of the ring or gasket and this, in turn, is dependent only on the pressure exerted upon the adjoining ends of the pipe members when the latter are forced together.

Other objects and advantages of the joint forming the present invention are:

1. It permits much wider angular deflection of contiguous pipe members at their joints.

2. It introduces no damaging tensional stresses in the rubber ring or gasket.

3. There is no rolling of the rubber ring into place.

4. There is no need to test for the position of the ring after placement to insure water tightness.

5. A joint construction which admits of the use of bell sockets of decreased depth as compared with standard sockets.

With these and other objects in view, the invention consists in the novel features of construction, combinations of elements and arrangements of parts hereinafter more fully described and pointed out in the following claims. In the accompanying drawings:

Figure 1:
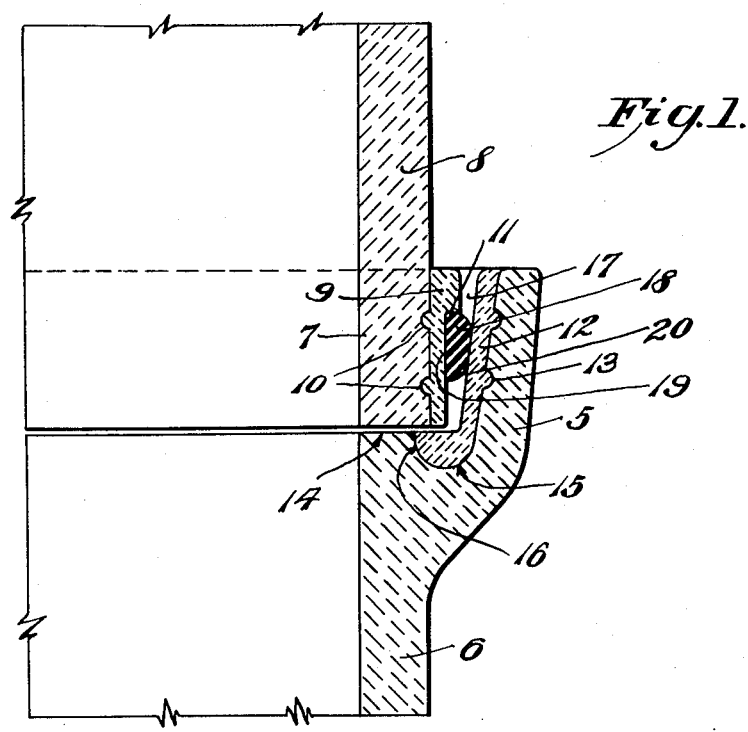
Fig. 1 is a longitudinal sectional view taken through the adjoining ends of a pair of pipe members formed with the joint comprising the present invention.
Figure 2:
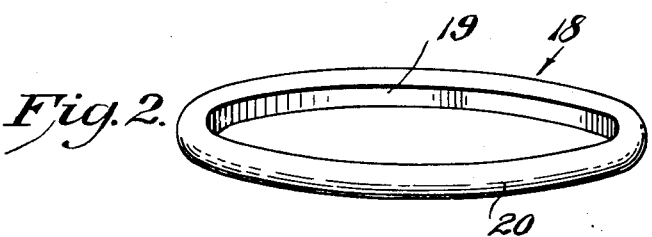
Fig. 2 is a perspective view of said ring or gasket.

Referring more particularly to the drawings, the numeral 5 designates the bell or socket end of a ceramic pipe 6, and the numeral 7 designates the interfitting spigot end of an adjoining pipe 8. It will be understood that these pipe members are of identical construction, being formed with the bell or socket at one end and the spigot at the other.

To compensate for variations in pipe diameter and out-of-round conditions, common in ceramic pipe manufacture, the spigot end 7 of each pipe member has molded on its outer wall a rigid socket collar 9. This collar may be formed from any suitable material, such as a compound of sulphur and silica, or its equivalent. Such a composition, while hot, is passed around the spigot end of each pipe member and, upon cooling and setting, shrinks into firm and positively retained engagement therewith. The outer walls of the spigot may be annularly scored as at 10 to provide anchoring regions into which the material of the collar extends, and which regions are used in preventing moisture seepage through the interface formed between the collar and spigot end of each pipe member.

By so casting the collar on the spigot, it forms a unitary part thereof, and enables the manufacturer to obtain precise outside dimensions together with a truly round condition. The collar possesses its maximum diameter at its outer or upper end, and has its outer cylindrical surface formed with an annular shoulder which functions as a ring or gasket stop. Below or within the shoulder, the outer circular surface of the collar is usually straight and untapered, or the same may have a taper less than that of the socket collar, if desired.

Similarly, the inner surface of the bell socket has molded thereon a rigid socket collar of the same or a similar composition as that of which the collar 9 is formed, the walls of the bell socket being annularly grooved or scored as at 13 so that the material of the collar 12 may form retaining ribs therein which obstruct moisture travel. The shoulder 14 of the bell socket 5 terminates contiguous to the outer band of the bell in an annular groove 15. Positioned in this groove is the lower or inner portion of the collar 12, the function of the groove being to provide a shoulder, as at 16, for resisting any tendency of the material forming the collar 12 to pull away from the adjacent wall of the bell, thus precluding fluid seepage between the interface formed by the walls of the bell socket and the socket collar 12.

Figure 3:
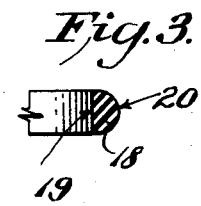
Fig. 3 is a fragmentary transverse sectional view taken through the compressible ring or gasket of the joint.

The annular space 17, formed between the adjacent walls of the collars 9 and 12, is somewhat V-shaped as a result of the taper or frustoconical formation of the inner surface of the socket collar. Adapted to occupy this space and positioned on the outer cylindrical surface of the spigot collar, in contact with the shoulder 11 thereof is a compressible or pressure deformable sealing ring or gasket 18, the ring being preferably formed from rubber or other materials having similar properties of compressibility. In transverse cross section, as shown in Fig. 3, the ring is half round or semicircular with its flat inner face 19 disposed in non-tensioned engagement with the outer cylindrical or slightly tapered face of the spigot collar, and with its half round face in contact with the frustoconical inner surface of the socket collar.

It will be apparent that the pipe members with the collars 9 and 12 thereon may be produced by a manufacturer under conditions in which close dimensional limits may be maintained. In completing the joint in the field, liquid soap may be applied to the inner face of the socket collar, so that the spigot end of the adjoining pipe, with the ring 18 thereon, may be longitudinally inserted into the bell socket, thereby compressing the ring uniformly around its circumference. The ring seals the joint against fluid passage, and its half round construction provides for relative rocking movement between the joined pipe members in order to compensate for coaxial misalignment, in the event such should exist, in said members. The ring is firmly held in place by the annular shoulder on the spigot collar and the taper of the inner wall of the socket collar.

The joint forming the present invention requires no important change in the design of pipe, except for the introduction of the annular recess or groove shown at 15 at the base of the socket, as indicated on the drawing. The purpose of this recess or groove is to reduce or prevent leakages through the joint which may occur by reason of the shrinking of the socket collar away from the adjoining walls of the bell end of the pipe. According to the design illustrated, all shrinkages tend to make the joint more rather than less watertight, since both the collar on the spigot and the collar in the socket by shrinking adhere more closely to the clay body of the pipe.

The joint itself is composed of the pipe collars and the single rubber ring. The collars are planned to be fabricated, preferably at the point of manufacture of the pipe, but can be fabricated on the site of the work, and composed of any material whose dimensions can be accurately controlled and which will be watertight, rigid and smooth. These properties can be obtained by employing conventional combinations of sulphur and silica sand, such as those known commercially as "Mineral Lead," "Hydro-tite" and "Leadite." However, it may be that variations in the compositions of these compounds will produce better results than the use of the compounds produced under either of the above trade designations.

It is also proposed for the benefit of securing further advantage of the joint to reduce the depth of the socket of conventional pipe, since the usual depth is not necessary for the type of joint forming the present invention. Lessening the socket depth makes it possible to compensate for even greater deflections than can be obtained when the joint is made of pipe of presently prevailing socket dimensions.

These modifications, including the recess in the base of the socket, and reduction in depth of the socket, are not important changes in the manufacture of commercial pipe, and can be readily attained without major change in plant equipment. The reduction in the depth of the socket is beneficial because it reduces cost of manufacture, weight and possibility of damage during shipment. The joint, however, is applicable to pipe of any conventional size, and its tightness depends only upon the degree of compression introduced into the gasket when forcing adjoining pipe members together. It will be observed that there is no straining of the material of the gasket, except for the forces placing the same under compression.

Figure 4:
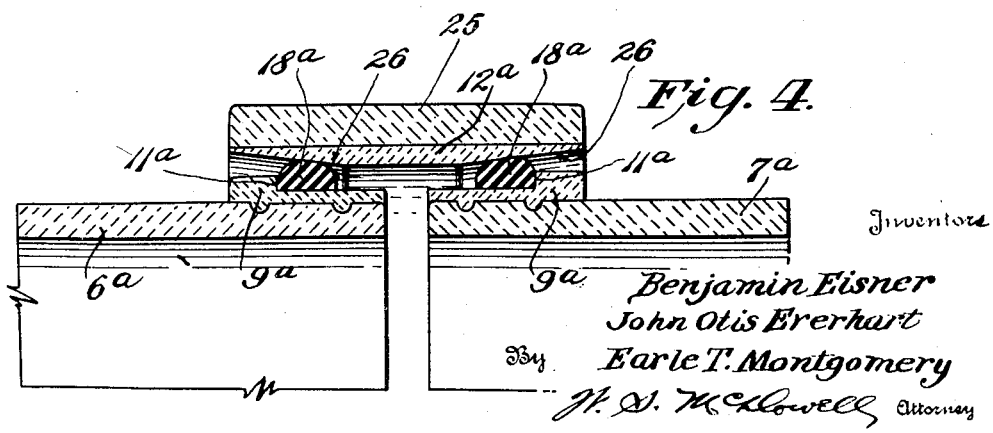
Fig. 4 is a vertical longitudinal sectional view disclosing the construction of the joint when straight butt-joint pipe members are employed.

While the joint forming the present invention has been described as being particularly applicable to pipe of the bell and spigot type, it may also be used in connection with the uniting of pipe of the straight butt-joint type, as shown in Fig. 4 of the drawings. In this form of the invention, the joint comprises the rigid spigot collars 9a which are molded on the ends of the pipe members 6a and 7a in the same manner as the collar 9 is molded on the spigot end 7. The collars 9a are annularly shouldered as at 11a to form positioning abutments for the rings or gaskets 18a.

Cooperative with these parts is an outer sleeve 25 having a stationary seating collar 12a molded on its inner annular surface, the collar 12a having its inner surfaces inwardly tapered as at 26 for compressive engagement with the rings or gaskets 18a. From this construction, it will be apparent that the joint provided in the modified form of Fig. 4 possesses the same advantages as the joint employed in the conventional bell and spigot type of pipe.

Various other modifications and adaptations will be apparent to those skilled in the art, and therefore we reserve the right to employ all such variations of the present invention that may be said to fall fairly within the scope of the following claims.

We claim:

1. In pipe construction, a pipe member provided at one end with a bell enlargement in which is formed an annular socket for the reception of the spigot end of a complemental pipe member, said socket terminating inwardly in an annular shoulder, there being an annular groove formed in said pipe member between said shoulder and the inner wall of said bell, and a collar of sulphur-silica or other composition surrounding the inner socket-defining bell enlargement and anchored at one end in said groove, whereby to retain the collar securely in said bell in event of shrinkage on the part of the collar.

2. A pipe joint comprising a pair of pipe members having interfitting bell socket and spigot ends, an annular band molded on the outer wall of the spigot end of one of said pipe members, a complemental band molded on the inner wall of the bell socket of the other of said pipe members, the inner end of said last-named band terminating in a laterally and inwardly directed enlargement and disposed in an annular anchoring groove provided in the inner end of the member having said bell socket, said spigot band being formed adjacent to its outer end with an annular shoulder, said bell socket band being inwardly tapered, and a sealing ring of compressible material interposed between said bands to resiliently separate said pipe members, to provide for relative movement therebetween and to close the space formed between said bands against fluid passage, said sealing ring being substantially semi-circular in cross section to provide a flat inner surface and a half rounded outer face, with the flat inner surface thereof disposed in engagement with the band on the spigot end of one of said pipe members and in contact with the annular shoulder thereof, and the half-rounded face of said ring in engagement with the tapering inner surface of the band on the bell end of the other of said pipe members, said ring being disposed substantially midway of the lengths of said bands.

BENJAMIN EISNER.
JOHN OTIS EVERHART.
EARLE T. MONTGOMERY.

REFERENCES CITED

The following references are of record in the file of this patent:

UNITED STATES PATENTS

| Number | Name | Date |
|---|---|---|
| 2,227,838 | Main | Jan. 7, 1941 |
| 2,275,235 | Shanklin et al. | Mar. 3, 1942 |
| 2,401,554 | Davids | June 4, 1946 |

FOREIGN PATENTS

| Number | Country | Date |
|---|---|---|
| 488 | Great Britain | Jan. 9, 1892 |
| 2,832 | Great Britain | Feb. 3, 1912 |
| 9,462 | Great Britain | May 18, 1892 |